United States Patent Office 3,351,620
Patented Nov. 7, 1967

3,351,620
POLYMERIZATION OF UNSATURATED CYCLIC HYDROCARBONS AND MIXTURES THEREOF WITH OLEFINIC HYDROCARBONS
Noboru Yamada, Keizo Shimada, and Toshio Takemura, Yamaguchi-ken, Japan, assignors to Teijin Limited, Osaka, Japan, a corporation of Japan
No Drawing. Filed Feb. 12, 1964, Ser. No. 344,255
Claims priority, application Japan, Feb. 25, 1963, 38/8,437, 38/8,438
2 Claims. (Cl. 260—88.2)

This invention relates to a process for polymerization of polymerizable unsaturated cyclic hydrocarbons or of mixtures of such hydrocarbons with olefinic hydrocarbons. Again, the invention provides a process for polymerization of those unsaturated hydrocarbons with the aid of novel ionic polymerization catalysts.

It is known that monoolefins having not less than three carbons such as proplyene, isobutylene and 2-methylbutene-1; conjugated diolefins such as butadiene and isoprene; and unsaturated, cyclic hydrocarbons having a vinyl-bond such as styrene, and α-methylstyrene can be polymerized with the aid of various catalysts to yield resinous or oily polymers. Those known polymerization processes include, for example, radical polymerization using peroxide catalysts; ionic polymerization using Friedel-Crafts catalysts such as anhydrous aluminum chloride, or such catalysts as alkali metals or alkylates of alkali metals; and further, processes using so-called Ziegler-type catalysts.

This invention provides a process for polymerization of the unsaturated hydrocarbons in the presence of vanadium oxychloride ($VOCl_3$) as the catalyst.

It is understood that the polymerization reaction of the unsaturated hydrocarbons in accordance with the invention is promoted by a certain type of cationic polymerization mechanism. However, presumably the reaction proceeds with an entirely new polymerization mechanism different from heretofore known chemical mechanisms of cationic polymerization. The discovery of the process of the invention is believed to open the way for development of new academic field relating to chemical mechanisms of polymerization. In the past, polymerization of unsaturated hydrocarbons by means of Friedel-Crafts catalysts such as, for example, anhydrous aluminum chloride or tin tetrachloride is generally known as cationic polymerization. For instance, isobutylene is known to be polymerizable with the aid of anhydrous aluminum chloride. Isobutylene polymerizes in a non-polar organic solvent, for example, a saturated hydrocarbon such as n-heptane, with the aid of anhydrous aluminum chloride. In contrast to this, vanadium oxychloride has no, or at most little, catalytic action for polymerization of isobutylylene. On the other hand, conjugated diolefins such as isoprene or unsaturated cyclic hydrocarbons such as styrene can be polymerized, also in non-polar organic solvents, by anhydrous aluminum chloride, however at a low rate of polymerization. Whereas, in the presence of vanadium oxychloride, those unsaturated hydrocarbons are polymerized very quickly. Thus, the catalytic action of vanadium oxychloride is markedly different from that of Friedel-Crafts catalysts represented by anhydrous aluminum chloride.

The invention is based on the discovery that unsaturated cyclic hydrocarbons can be very quickly polymerized with the aid of vanadium oxychloride, and that although monoolefins sush as isobutylene do not appreciably polymerize under the action of vanadium oxychloride, in the additional presence of unsaturated cyclic hydrocarbons such as styrene, they can readily be copolymerized with the latter.

Mr. Szwark discovered that polymerization of styrene and butadiene under the catalytic action of sodium-naphthalene adducts yields so-called living polymers. (Nature, 178, 1168, 1956). His polymerization reaction mechanism is assumed to be such that by the action of sodium, radical anion of naphthalene is formed, and further electron transfer to the monomer such as styrene takes place to form radical anion of the monomer, thus promoting the polymerization. The catalytic action of vanadium oxychloride in the invention well resembles that of the sodium as above-described, but is different in the point that the latter uses cationic polymerization. This fact is well proven by the fact that isobutylene can be polymerized in accordance with the invention. That is, in the invention presumably the polymerization is initiated by the formation of radical cation caused by electron transfer. Until date, such typical cation radical-initiated polymerization is not known. That such electron transfer takes place can be inferred because of the color change in the reaction system. For example, n-heptane solution of vanadium oxychloride is yellow. Upon addition of an unsaturated cyclic hydrocarbon such as styrene thereto, it changes to dark red and the polymerization quickly takes place. This phenomenon is entirely the same to the color change accompanying the electron transfer between sodium or sodium-naphthalene adducts and styrene as observed by Szwarc. In case of polymerizing styrene, etc. with the aid of Friedel-Crafts catalysts such as tin tetrachloride, such color change is not observed.

The chemical mechanism of the polymerization reaction of the present process is presumed to be as follows, using the example of vanadium oxychloride.

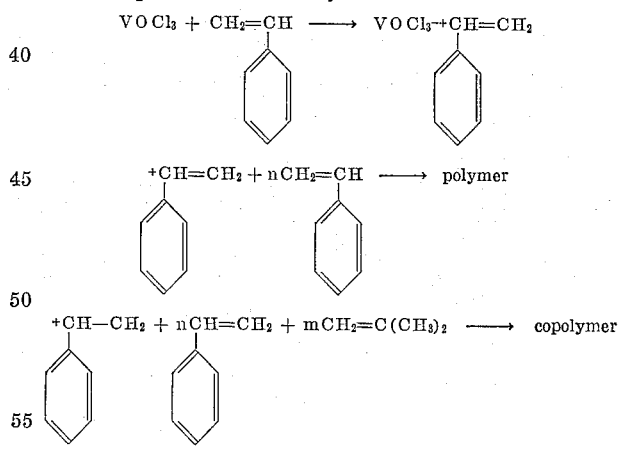

Generally, vanadium oxychloride includes many compounds represented by the formulae $VOCl_3$, $VOCl_2$, $VOCl$ and $V_2O_2Cl$. However, the "vanadium oxychloride" useful as the catalyst of the invention is the compound represented by the formula $VOCl_3$. Therefore it is to be understood that "vanadium oxychloride" throughout the specification and claims refers to the compound of the formula $VOCl_3$. While those compounds of the formulae $VOCl_2$, $VOCl$ and $V_2O_2Cl$ are all solid at room temperature, the vanadium oxychloride of the formula $VOCl_3$ used in the invention is a yellow liquid at room temperature having a boiling point of 126°–127° C., which decomposes reacting with water or alcohols.

"Polymerizable unsaturated cyclic hydrocarbons" as referred to in the invention include polymerizable hydrocarbons and derivatives thereof having one or more vinyl radicals or carbon to carbon double bonds in their rings such as styrene and derivatives thereof like α-methylstyrene, α-ethylstyrene and p-methylstyrene; vinylnaphthalene, indene, cyclopentadiene and methylenecyclobutene. Some of the olefinic hydrocarbons polymerizable or co-polymerizable with the unsaturated cyclic hydrocarbons are those of 3–10 carbon atoms such as propylene, n-butene-1, isobutylene, 2-methylbutene-1, 2-methylbutene-2, 3-methylbutene-1, 2-methylpentene-1 and 2-methylhexene-1. Among those, particularly preferred are isobutylene and 2-methylbutene-1, which copolymerize very quickly. The polymerization is carried out in such a manner that under nitrogen atmosphere, an unsaturated cyclic hydrocarbon or that with an olefinic hydrocarbon are introduced into an organic solvent solution of vanadium oxychloride, and are reacted at temperatures ranging from −110° to 100° C., preferably from −80° to 40° C. The reaction progresses rapidly, turning the liquid reaction mixture to a dark red, tacky solution. After completion of the reaction, an alcohol is added to the polymeric mixture to stop the reaction. Upon the addition of the alcohol, the catalyst decomposes and the liquid reaction mixture becomes green or yellowish brown, precipitating a polymer which is then separated, dissolved in n-heptane or benzene, etc., and again precipitated by addition of an alcohol. By repetition of such alcohol-washing several times, the catalyst residue on the polymer is removed and the polymer is refined.

As the alcohol to be used for the refining, for example, methyl, ethyl, n-propyl and isopropyl alcohols are suitable.

The polymerization of the polymerizable, unsaturated cyclic hydrocarbons of the invention is advantageously carried out in an organic solvent. Some of the useful solvents are inert hydrocarbons such as hexane, heptane, octane and benzene, and halogenated hydrocarbons such as methylene chloride, ethyl chloride, chloroform and carbon tetrachloride.

Since the vanadium oxychloride used as the catalyst in the invention reacts with water or alcohol and decomposes, all of the polymerizable, unsaturated cyclic hydrocarbons, olefinic hydrocarbons and organic solvents used in the invention should substantially be free of water and alcohol.

In the polymerization or copolymerization in accordance with the process of the invention, vanadium oxychloride is used at the ratio of 0.1 to 10% by weight of the mixture of the monomer or monomers with the solvent. The polymerization is performed in the presence of the solvent. The amount of the solvent is not critical but preferably 1 to 5 times by volume of the solvent to the monomer or monomers is used.

The amount of the polymerizable, unsaturated cyclic hydrocarbon used in the copolymerization in accordance with the process of the invention is, in terms of mol ratio to the olefinic hydrocarbon, 0.001–5, and when a homogeneous copolymer is desired, preferably within the range of 0.02–0.4. According to the invention both a copolymer of uniform composition or a mixture of a copolymer with a homopolymer are obtainable depending on conditions employed, both cases being within the scope of the invention.

In the process of the invention, a suitable promotor added to the catalyst vanadium oxychloride can favorably affect rate and degree of polymerization or copolymer composition.

As such promotors there are, for example, aromatic hydrocarbons and derivatives thereof such as aromatic nitrogen compounds, aromatic oxycompounds, and aromatic sulfur compounds; and those compounds having at least one carbon to sulfur double bond.

The typical of those promotors include aromatic hydrocarbons such as naphthalene, anthracene and fluorene; aromatic amines such as aniline, diphenyl amine, p-toluydine and α-naphthylamine; aromatic oxy-compounds such as acetophenone, benzyl alcohol, α-naphthyl methylether and benzyl benzoate; aromatic sulfur compounds such as thiophenol, propyl phenyl mercaptan and dibenzothiophene; and sulfur compounds such as carbon disulfide and diphenyl thiocarbazone.

These promotors are effective when present in an amount not less than 0.1 mol percent to the catalyst, the upper limit somewhat differing depending on the individual promotor. For example, among the above-named, aromatic amines and the sulfur compounds except carbon disulfide are effective each in the amount of not more than 100 mol percent, while as to the rest of the above-named, there is no specific upper limit. The optimum amount of each individual promotor to be used can be suitably and readily determined case by case by experiments.

It is advantageous according to specific objects to carry out the polymerization of an unsaturated cyclic hydrocarbon or the copolymerization thereof with an olefinic hydrocarbon with the catalytic aid of vanadium oxychloride in the presence of a suitable promotor, and which is within the scope of the process of the invention.

The polymers obtained from the unsaturated hydrocarbons and the mixtures thereof with olefinic hydrocarbons in accordance with the invention widely vary in types and properties, which are useful as materials for synthetic rubber, plastics, adhesive agents and paints.

The invention will now be explained with reference to the following examples.

*Example 1*

Into a pressure glass vessel of 100 cc. capacity, an ampoule filled with 10 millimols of vanadium oxychloride was placed, and the inside pressure of the vessel was reduced. Thereafter further the vessel was charged with 30 cc. of n-heptane and 0.131 mol (13.6 g.) of refined styrene, and the inside pressure was raised to atmospheric with dried and refined nitrogen gas. The vessel was then cooled to 0° C., the ampoule was broken, and the polymerization was initiated. After 4 hours of the polymerization at 0° C., the reaction mixture was poured into 500 cc. of cold methanol. Thereby precipitated powdery polymer was separated and washed with methanol several times, and dried under a reduced pressure to yield a white, powdery polymer which weighed 13.5 g. corresponding to 99.3% yield.

*Examples 2–5*

All the operational conditions were similar to those employed in Example 1 above.

| Example No. | Solvent (cc.) | Styrene monomer (mol.) | $VOCl_3$ (millimol.) | Reaction conditions | | Yield (percent) |
| --- | --- | --- | --- | --- | --- | --- |
| | | | | (° C.) | Hours | |
| 2 | Carbon tetrachloride, 30 | 0.122 | 10 | 0 | 4 | 92.1 |
| 3 | Methylene chloride, 30 | 0.096 | 10 | 0 | 4 | 80.0 |
| 4 | Ethyl chloride, 30 | 0.087 | 10 | 0 | 4 | 97.8 |
| 5 | n-Heptane, 30 | 0.112 | 10 | 30 | 4 | 98.9 |

Example 6

A pressure bottle of 100 cc. capacity was charged with an ampoule filled with 10 millimols of vanadium oxychloride. 0.112 mol (13.00 g.) of idene, and 30 cc. of n-heptane, and its inside air was replaced with dried and refined nitrogen gas. Thereafter at −78° C. the ampoule was broken and the polymerization was initiated. After 8 hours of the polymerization, the reaction mixture was poured into 500 cc. of cold methanol. Thus obtained powdery polymer was washed several times with cold methanol, and dried under a reduced pressure to yield a white, powdery polymer, which weighed 9.75 g. corresponding to 75.0% yield.

Examples 7–9

Under the same operational conditions as employed in Example 6, the following results were obtained.

| Example No. | Monomer (mol.) | N-heptane (cc.) | VOCl$_3$ (millimol) | Reaction conditions Temp. (° C.) | Time | Yield (percent) |
|---|---|---|---|---|---|---|
| 7 | α-Methylstyrene, 0.115 | 30 | 10 | 0 | 30 min | 92.1 |
| 8 | Cyclopentadiene, 0.182 | 30 | 10 | 0 | 30 hrs | 94.2 |
| 9 | Indene, 0.112 | 30 | 10 | 0 | 10 min | 99.2 |

Example 10

A pressure bottle of 100 cc. capacity was charged with 10 millimols of vanadium oxychloride, 30 cc. of n-heptane, 0.130 mol (13.0 g.) of styrene and 0.043 mol (5.0 g.) of indene, and the content was polymerized at 0° C. after the air inside the bottle was replaced with nitrogen gas. After an hour of the polymerization, the reaction mixture was poured into 500 cc. of cold methanol, and so obtained powdery polymer was further washed several times with cold methanol and then dried under a reduced pressure to yield a white, powdery polymer. The amount of the polymer obtained was 17.2 g., corresponding to 95.6% yield.

Example 11

A pressure bottle of 100 cc. capacity was charged with 10 millimols of vanadium oxychloride, 30 cc. of n-heptane, 0.130 mol (13.0 g.) of styrene and 0.076 mol (5.0 g.) of cyclopentadiene, and its inside air was replaced with nitrogen gas. The content was then polymerized at 0° C. for 10 hours. After polymerization and the finishing treatments similar to those in Example 10, a white, powdery polymer was obtained in an amount of 16.9 g. corresponding to 93.9% yield.

Example 12

10 millimols of vanadium of oxychloride was sealed into an ampoule in dry nitrogen atmosphere. Into a pressure bottle of 100 cc. capacity, 30 cc. of n-heptane, 0.174 mol (18.18 g.) of refined styrene and the ampoule of the catalyst were placed, and the entire system was cooled in a Dry Ice-methanol bath of −78° C. After complete substitution of the inside air of the bottle with nitrogen, 0.223 mol (12.54 g.) of refined isobutylene was introduced thereinto. (Isobutylene/styrene=1.28, in terms of mol ratio). The reaction vessel was withdrawn from the cooling bath, and when the entire reaction vessel reached the temperature of 0° C., the catalyst ampoule was broken to initiate the polymerization. The polymerization was carried out for 20 hours at 0° C. After completion of the polymerization, the reaction mixture was poured into 50 cc. of cold methanol, and thereby precipitated polymer was separated and refined by several washings with methanol. Drying the product under a reduced pressure, a rubbery polymer was obtained which weighed 30.22 g. corresponding to 98.4% yield.

Examples 13–26

All the operational conditions employed in the examples below were similar to those in Example 12.

| Ex. No. | Solvent n-heptane (cc.) | Monomer Styrene (mol.) | Monomer Isobutylene (mol.) | Mol ratio (IB/S) | VOCl$_3$ (millimol.) | Reaction conditions (° C.) | Hours | Yield (percent) |
|---|---|---|---|---|---|---|---|---|
| 13 | 30 | 0.0611 | 0.156 | 2.56 | 5 | 0 | 20 | 99.1 |
| 14 | 30 | 0.0175 | 0.190 | 10.88 | 5 | 0 | 20 | 98.2 |
| 15 | 30 | 0.0087 | 0.223 | 25.60 | 5 | 0 | 20 | 96.7 |
| 16 | 30 | 0.0018 | 0.223 | 128.0 | 5 | 0 | 20 | 86.7 |
| 17 | 30 | 0.0611 | 0.156 | 2.56 | 5 | 0 | 4 | 80.3 |
| 18 | 15 | 0.0611 | 0.156 | 2.56 | 5 | 0 | 3 | 99.8 |
| 19 | 60 | 0.0611 | 0.156 | 2.56 | 5 | 0 | 3 | 10.1 |
| 20 | 30 | 0.0611 | 0.156 | 2.56 | 5 | −78 | 2 | 8.9 |
| 21 | 30 | 0.0611 | 0.156 | 2.56 | 5 | 0 | 2 | 38.6 |
| 22 | 30 | 0.0611 | 0.156 | 2.56 | 5 | +30 | 2 | 86.1 |
| 23 | 30 | 0.0873 | 0.112 | 1.28 | 5 | 0 | 4 | 71.7 |
| 24 | 30 | 0.0349 | 0.201 | 5.74 | 5 | 0 | 4 | 86.8 |
| 25 | 50 | 0.295 | 0.127 | 0.43 | 5 | 5 | 20 | 88.9 |
| 26 | 50 | 0.194 | 0.155 | 0.80 | 5 | 5 | 20 | 91.1 |

Examples 27–35

Employing exactly the same operational conditions and post-polymerization treatments as in Example 12, the following results were obtained. As the solvent, 50 cc. of n-heptane was used for all of the following examples except Example 27 which used 50 cc. of carbon tetrachloride.

| Example No. | Cyclic hydrocarbon (mol.) | Olefin (mol.) | VOCl₃ (millimol.) | Reaction conditions Temp. (° C.) | Reaction conditions Time (hours) | Yield (percent) |
|---|---|---|---|---|---|---|
| 27 | Styrene, 0.087 | Isobutylene, 0.112 | 5 | 0 | 4 | 88.0 |
| 28 | Styrene, 0.052 | 2-methylbutene-1, 0.112 | 5 | 0 | 15 | 71.8 |
| 29 | Styrene, 0.087 | Propylene, 0.238 | 5 | 50 | 20 | 54.5 |
| 30 | ----do---- | 4-methylpentene-1, 0.060 | 5 | 50 | 40 | 73.3 |
| 31 | Indene, 0.052 | Isobutylene, 0.134 | 5 | 0 | 2 | 78.4 |
| 32 | Indene, 0.060 | 2-methylbutene-1, 0.112 | 5 | 0 | 30 | 82.6 |
| 33 | α-Methylstyrene, 0.046 | Isobutylene, 0.134 | 5 | 0 | 15 | 80.6 |
| 34 | ----do---- | 2-methylbutene-1, 0.112 | 5 | −78 | 50 | 36.4 |
| 35 | ----do---- | 2-methylbutene-2, 0.112 | 5 | 0 | 50 | 56.3 |

*Example 36*

After the manner of Example 12, 10.0 g. of styrene and 10.0 g. of isobutylene were copolymerized with the aid of a catalyst system composed of 5 millimols of vanadium oxychloride and 2 millimols of naphthalene. The polymerization was continued for 12 hours at 10° C., and a polymer of uniform composition was obtained at the yield of 69.5%.

When the same experiment was repeated in the absence of the naphthalene, as a part of the product granular styrene homopolymer was formed and a uniform copolymer could not be obtained.

We claim:

1. A process for the polymerization of polymerizable unsaturated cyclic hydrocarbons or mixtures thereof with an aliphatic monoolefin having from 3 to 10 carbon atoms, wherein said polymerization is carried out in an inert organic solvent in the presence of a catalyst consisting of VOCl₃.

2. The process of claim 1 wherein said polymerization is carried out at a temperature of from −110° C. to 100° C. and said catalyst is employed in an amount of from 0.1 to 10 percent by weight of the total amount of the polymerizable material and inert organic solvent.

References Cited

UNITED STATES PATENTS

| | | | |
|---|---|---|---|
| 2,122,826 | 7/1938 | Peski | 260—94.8 |
| 2,479,618 | 8/1949 | Hersberger | 260—93.5 |
| 3,236,824 | 2/1966 | Wilhjelm | 260—94.9 |
| 3,251,815 | 5/1966 | Yamada et al. | 260—94.3 |

JOSEPH L. SCHOFER, *Primary Examiner.*

E. J. SMITH, *Assistant Examiner.*